Figure 1:
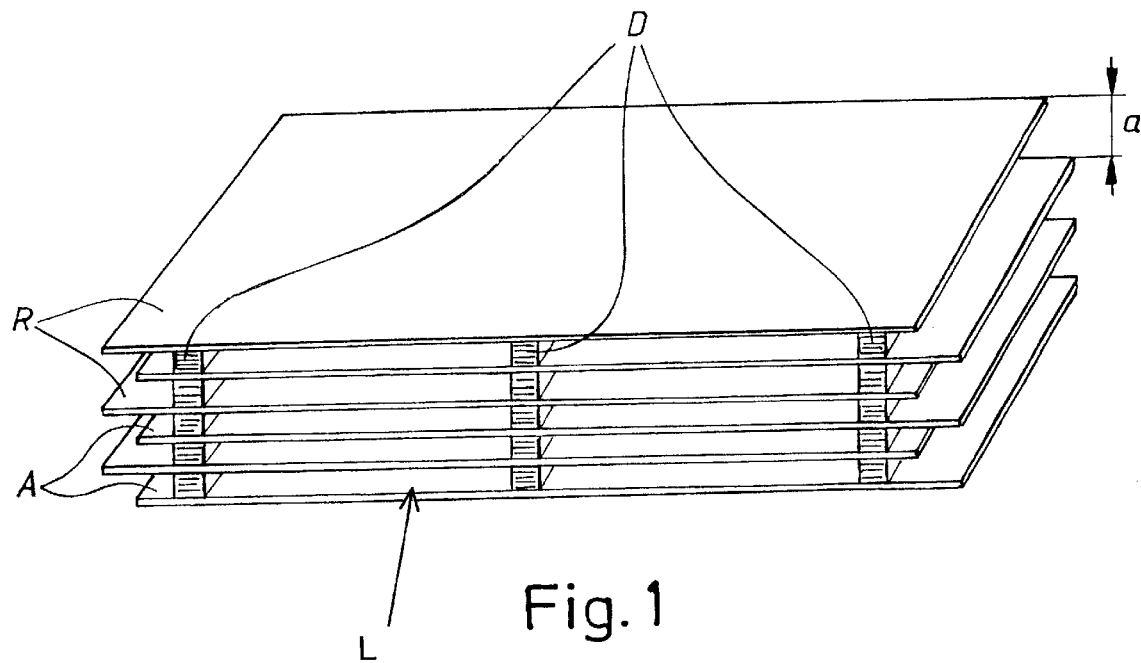
Figure 2:
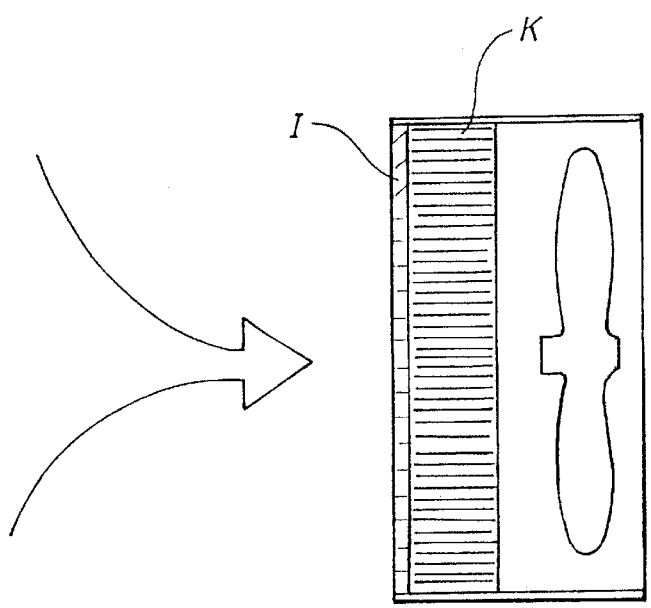

United States Patent [19]
Loreth

[11] Patent Number: 6,117,216
[45] Date of Patent: Sep. 12, 2000

[54] PRECIPITATOR FOR CLEANING OF AIR FROM ELECTRICALLY CHARGED AEROSOLS

[75] Inventor: Andrzej Loreth, Åkersberga, Sweden

[73] Assignee: Strainer LPB Aktiebolag, Akersberga, Sweden

[21] Appl. No.: 09/029,584

[22] PCT Filed: Sep. 9, 1996

[86] PCT No.: PCT/SE96/01114

§ 371 Date: Feb. 27, 1998

§ 102(e) Date: Feb. 27, 1998

[87] PCT Pub. No.: WO97/09117

PCT Pub. Date: Mar. 13, 1997

[30] Foreign Application Priority Data

Sep. 8, 1995 [SE] Sweden .................................. 9503096

[51] Int. Cl.[7] ........................................................ B03C 3/64
[52] U.S. Cl. ........................... 96/62; 96/64; 96/69; 96/79; 96/86; 96/88; 96/100
[58] Field of Search ........................... 96/69, 96, 97–100, 96/77–79, 85–88, 62–64; 55/DIG. 38; 95/59

[56] References Cited

U.S. PATENT DOCUMENTS

| | | | |
|---|---|---|---|
| 2,181,767 | 11/1939 | Penney | 96/79 |
| 2,873,000 | 2/1959 | Elam | 96/77 |
| 2,875,845 | 3/1959 | Penney | 96/85 |
| 3,487,610 | 1/1970 | Brown et al. | 96/69 X |
| 3,918,939 | 11/1975 | Hardt | 96/99 |
| 4,072,477 | 2/1978 | Hanson et al. | 55/DIG. 38 |
| 4,234,324 | 11/1980 | Dodge, Jr. | 55/DIG. 5 |
| 4,652,281 | 3/1987 | Masuda et al. | 96/69 |
| 4,861,356 | 8/1989 | Penney | 96/77 |
| 5,766,318 | 6/1998 | Loreth et al. | 96/69 |
| 5,993,521 | 11/1999 | Loreth et al. | 96/69 |

FOREIGN PATENT DOCUMENTS

| | | |
|---|---|---|
| 184334 | 6/1963 | Sweden . |
| 469466 | 7/1993 | Sweden . |
| WO 95/07759 | 3/1995 | WIPO . |
| WO 95/19225 | 7/1995 | WIPO . |

OTHER PUBLICATIONS

Dialog Information Services, World Patent Index 81–96, Dialog accession No. 002041379, WPI accession No. 78–54431A/30, Fuji Electric MFG KK: "Electric dust collector—in which pole plates have water–repelling coating of e.g. PTFE with epoxyl resin, PVC or polyethylene"; & JP,A,53069980, 780621, 7830 (Basic).

Primary Examiner—Richard L. Chiesa
Attorney, Agent, or Firm—Pearne & Gordon LLP

[57] ABSTRACT

An electrostatic precipitator for purifying air from charged particles. The precipitator includes at least a pair of electrode elements (R and A) spaced apart by a gap distance (a). The electrode elements are moisture-proof. At least one of the electrode elements is composed of a high ohmic cellulose material and is coated with a thin moisture-proof layer.

7 Claims, 1 Drawing Sheet

PRECIPITATOR FOR CLEANING OF AIR FROM ELECTRICALLY CHARGED AEROSOLS

This application is the national stage of International Application No. PCT/SE96/01114, filed on Sep. 9, 1996.

BACKGROUND OF THE INVENTION

In SE-B-469 466 a two-step electro filter is described, said filter having an ionizing section that downstream, seen in the desired air transport, is followed by a so called electrostatic precipitator. The electrode elements of the electrostatic precipitator, said elements in the disclosed design being planar plates, are preferably made out of a material that is considered to be highly resistive or antistatic (so called dissipative material). However, in other embodiments the electrode elements may have other shapes. By using such a material according to the mentioned patent document an essential improvement of the separation ability may be achieved. The reason therefore is that the voltage that is created between the electrode elements may assume higher values than previously known electrofilters having electrode elements made out of metallic material and hence low resistive material.

In SE-A-9303894-1 a further development of the design of an electrostatic precipitator according to the patent document mentioned above is described. According to SE-A-9303894-1 electrical screening of certain portions of the electrodes of the electrostatic precipitator gives rise to possibilities to further increase the voltage between said electrodes. The effect of this is an increased separation ability.

The present invention is preferably applied in connection with two-step electrofilters according to the patent documents mentioned above. However, the invention can also be used in connection with previously known two-step electrofilters or devices based on ion wind of the type described in EP-B-0 264 363 or other devices for separating electrically charged aerosols (see SE-A-9400110-4).

The electrostatic precipitator of an electrofilter normally consists of a group of electrically repelling electrode elements R and a group of electrically attracting electrodes A arranged in such a way that the electrode elements of one group are positioned with a gap distance (a) and alternately to electrode elements of the other group, said elements of different groups being at different potential vis-a-vis each other.

As described e.g. in SE-B-469 466 said electrode elements are preferably made out of cellulose based material.

In practice it has shown that the performance of the device is to a great extent depending from inter alia paper quality and also external factors as the humidity of the air and the fouling of the filter cassette. By increasing humidity the resistivity of the cellulose material decreases dramatically and a properly functioning and dimensioned electrostatic precipitator loses or reduces its ability to separate particles. Further as a result of the decreased resistivity in the material of the electrodes and a high voltage between said electrodes the electrostatic precipitator may emit substantial amounts of ozone (as a result of the corona discharge primarily between the edge portions of the electrode elements A and R).

SUMMARY OF THE INVENTION

In accordance with the present invention, an electrostatic precipitator for charged aerosol particles is provided. The precipitator includes at least two electrode elements (R and A) The electrode elements are electrically insulated from each other and are at different electrical potentials. The electrode elements are arranged at a gap distance (a) from each other. At least one electrode is made out of cellulose based, high-ohmic material. Both electrode elements are moisture resistant. The cellulose based electrode element is coated with a moisture proof layer, which is thin so that electrical charges may pass through the layer.

BRIEF DESCRIPTION OF THE DRAWINGS

The features, aspects, and advantages of the present invention will become better understood with regard to the following description, appended claims, and accompanying drawings where:

FIG. 1 shows a perspective view of an electrostatic precipitator; and

FIG. 2 shows a schematic view of the electrostatic precipitator disposed adjacent to an air purifier.

DETAILED DESCRIPTION OF THE PREFERRED EMBODIMENTS

The basic aim of the invention is to create an improved air purification device based on an improved electrostatic precipitator mainly based upon cellulose based material. According to the invention one characterizing feature is that at least one of the electrode elements A or R is made out of a cellulose based material that is very high-ohmic, preferably with a resistivity corresponding to the concept of antistatic or dissipative and also that both electrode elements are arranged in such a way that they are not affected by or at least not to an extent worth mentioning affected by humidity. If only one electrode element is made out of cellulose based material the other electrode element, preferably electrode element A, may be made out of metallic material, e.g. thin aluminium plates.

A preferred embodiment of the electrostatic precipitator according to the invention includes two groups of elements R and A arranged in such a way that electrode elements R alternate with electrode elements A at a distance (a) from each other and being connected to different terminals of the high voltage source (HVU). Both these groups of electrode elements are made out of cellulose based high-ohmic and preferably dissipative material.

Electrode elements A are provided with or treated in accordance with the appending patent claims, said elements having a thin moisture barrier coating or impregnation against moisture.

A prerequisite for an electrically charged particle to adhere to electrode element A is that said element is able to emit its electrical charge to the deposition electrode in connection with the deposition of the particle on said electrode. It has been shown experimentally that a very thin plastic coating that constitutes a moisture barrier, e.g. of polyethylene or the like, on the separating electrode A does not prevent a charged aerosol from emitting its charging to the "current-carrying" frame of the electrode element A.

It should be noted that the expression "current-carrying" in this connection means that the material in question has a certain conductivity, i.e. also a dissipative material is included in said expression.

Thus there is a distinction between the expression electrically insulated coatings that on one hand e.g. can be used on repelling electrode elements R in a electrostatic precipitator to prevent spark-over between adjacent electrode elements R and A charged relative each other to several KV or to prevent corona discharge from the edge portions of the electrode elements, and on the other hand the moisture insulating treatment that characterizes the present invention, e.g. the application of a plastic film. The material can be the same in both cases, i.e. it can be classified as electrically insulating.

In order to prevent discharge of corona type or spark-over between electrode elements an electrical insulator is required that manages a voltage of several KV. A moisture barrier of electrically insulating material, e.g. a plastic film with a significant thickness of about 20–40 micrometer is given its dimensions only to prevent moisture absorption and its thickness is several powers lower than what is needed to prevent spark-over between respective electrode elements.

The repelling electrode elements R can be designed in the same way as the attracting electrode elements but they can also be coated with a more high test insulating coating, e.g. an essentially thicker one than the one needed to protect the electrode elements against moisture. Thereby the risk for partial discharges between the electrode elements, due to dirt deposition between said elements, especially at a high moisture of air, is reduced. Preferably and in certain demanding applications it is necessary to provide an electrically insulated structure around the edge portions of the electrodes. Such a structure should be given dimensions to prevent almost entirely all corona discharge from the edge portions of the electrode elements. Otherwise there is a risk that such a discharge electrically neutralizes some of the aerosol particles that would adhere on the precipitation surfaces of the electrode elements and instead said particles without hindrance through-pass the electrostatic precipitator. Since the aim of the present invention is to provide electrostatic separation of particles that results in an almost complete filtration it is necessary that such undesired corona discharge is prevented.

Experimentally it has turned out that a material having the trade name "INVERCOTE PB" has excellent properties for the purpose in question. Said material is manufactured by the company "IGGESUND PAPERBOARD".

FIG. 1 discloses the electrostatic precipitator built up by moisture proof material in accordance with the above given description. The electrode elements of the precipitator are arranged as parallel planar surfaces located at a gap distance (a) from each other by the aid of spacers D that in the disclosed embodiment in the shape of thin strips extend essentially in the desired air flow direction through the electrostatic precipitator and in the disclosed embodiment being provided directly upon the surfaces of the electrode elements. The thickness of the strips in a finished filter cassette is equal to the desired gap distance (a) between the respective adjacent electrode elements R and A.

By this arrangement several rectangular air flow ducts L are created between each pair of electrode elements R and A and said spacer elements D. Said spacer elements D are made out of insulated material, e.g. polyethylene but also other and even more high test insulating materials can be used.

Neither is there anything against in providing the spacer structure in a different way, i.e. both the distance between the respective electrode elements and the enclosed air flow ducts L. This can be achieved e.g. with the aid of special cast compounds, glue or the like.

It is not required but is preferred that the air flow ducts L, created between adjacent electrode elements A, R and the insulated spacer structure, extend along the entire length of the precipitator.

Electrode elements of the precipitator are preferably so arranged, at least from one outlet side or one inlet side, that electrode elements of both sets have their front edges located in the same plane.

A electrostatic precipitator built up in accordance with the embodiment disclosed in FIG. 1 is in most cases effectively cleaned by a vacuum cleaner.

When moving the vacumm cleaner nozzle across the inlet side or the outlet side of the electrostatic precipitator, said vacuum cleaner nozzle may cover one or a restricted number of air flow ducts L. Then the air flow velocity will reach about 15 to 30 m/s, said velocity being sufficient to effectively remove most of the collected dust.

To reduce the tendency of corona discharge at the edge portions of the electrode elements it is preferred that the electrical connection of respective group of electrode elements is effected as far as possible from each other. Therfore, as shown in FIG. 1 the connection is preferably at the short side of the filter cassette, i.e. the electrode elements of one set are electrically connected to contacting elements of one short side of the filter cassette and electrode elements of the other set to the other. The connection may be effected in the way shown in FIG. 1 by having electrode elements of the same polarity displaced sideways vis-a-vis electrode elements of the other polarity, and hence the respective edge portions being accessible to contact.

In FIG. 2 a further development of the present invention is schematically shown. The electrostatic precipitator (K) is located very close and preferably tightly connected to the inlet structure (I) of an air purifier that ionizes aerosols in the closest vicinity of the device, i.e. in the room or space where the device is located. The inlet structure (I) can be designed as a grate, net, perforated surface or the like and preferably the open surfaces of said structure define through-going air flow ducts. An inlet structure (I) defined in such a way makes efficient cleaning of the precipitator possible using a device where the electrostatic precipitator according to the present invention uses a vacuum cleaner as described above.

In order to further increase the field of use of the device it can be equipped with a suitable coarse or fine filter that preferably is adapted to be collapsible into the inlet grate in order not to jeopardize the vacuum cleaner function of the filter cassette. It should also be possible to clean, by a vacuum cleaner, a pre-filter designed in such a way.

A device designed around the characterizing patent claims of the present invention is preferably designed to achieve a very high degree of precipitation that corresponds to the performance of a so called HEPA filter. By such a design of the device it is necessary that all air transported through the device is forced to pass through the precipitator. Thus it is necessary to provide a suitable sealing around the filter cassette and the air flow duct to prevent leakage of air that by-passes the electrostatic precipitator (K). It is further preferred that one of the edge portion of the electrodes R and A respectively or the edge portions of both electrodes are insulated electrically to prevent corona discharge from said portions. Otherwise there is a risk that some of the aerosols charged in the ionizing chamber are re-charged or lose there charge before they enter the gap between the electrodes of the electrostatic precipitator (K).

The electrostatic precipitator (K) of the present invention is preferably used in ventilation ducts. In the previously known way the charging of aerosol particles is effected upstream of the electrostatic precipitator (K), seen in the air flow direction.

By such a use it is suitable that the electrostatic precipitator (K) is located upstream of or downstream of and close to an inlet structure (I) that is in the shape of grate, net or the like allowing air flow to pass through. At least the portion of the grate, net or the like that is closest to the electrostatic precipitator (K) is made out of electrically insulating material. Preferably said portion is provided in accordance with the description of above to enable cleaning of the filter cassette with the aid of the vacuum cleaner. Such an inlet structure may also constitute holder for the filter cassette and also take care of the electrical connection of the filter cassette to a high voltage source.

In a ventilation duct or other type of air cleaner several electrostatic precipitators may be arranged in a cascade pattern especially if they are designed as planar panels, i.e. their extension perpendicular to the desired air flow is much greater than the length, seen in the air flow direction, of the electrodes of the precipitator.

Another important benefit of the electrostatic precipitator according to the present invention is that in many practical application areas very simple and hence unexpensive high voltage sources may be used since the high voltage feeding of the electrostatic precipitator will take place without any or almost without any currency draw on the high voltage side. According to a practical arrangement, especially if also charging of aerosols takes place without any currency draw worth mentioning, this being the case when ionizing occurs in the space where the device is located (see SE-A 9401110-4), a very simple and unexpensive technique could be used for the design of high voltage sources. The technique for designing such high voltage sources is well known but has so far not been used in connection with electrostatic filters.

Such a voltage source is characterized by its running current being a single microampere or less and its short-curcuit current being lower than a few microampere.

What is claimed is:

1. Electrostatic precipitator for charged aerosol particles including at least two electrode elements (R and A), said elements being electrically insulated from each other, being at different electrical potentials, and being arranged at a gap distance (a) from each other, wherein at least one electrode is made out of cellulose based, high-ohmic material and wherein both electrode elements are moisture resistant, the cellulose based electrode element being coated with a moisture proof layer, said layer being thin so that electrical charges may pass through said layer, said layer having a thickness of between about 20–40 micrometers.

2. Device according to claim 1, wherein both electrode elements are made out of cellulose based material.

3. Device according to claim 1, wherein a cellulose based frame of the electrode element is coated by a thin plastic film.

4. Device according to claim 1, wherein the gap distance (a) between the electrode elements is effected by spacers (D) or spacing means (d) that extend essentially in an air flow direction through the device and, together with the electrode elements (R and A), create air flow ducts (L).

5. Device according to claim 4, wherein the spacing means (d) are created by a suitable cast compound or glue.

6. Device according to claim 1, further comprising an inlet structure (I) having ribs or openings that form air flow ducts in the inlet structure (I), said openings being located directly adjacent to the inlet side of the electrostatic precipitator.

7. Device according to claim 1, wherein the electrostatic precipitator is arranged in an air flow duct of an air purifying device such that all air that passes the duct is forced to pass the electrostatic precipitator.

* * * * *

UNITED STATES PATENT AND TRADEMARK OFFICE
CERTIFICATE OF CORRECTION

PATENT NO. : 6,117,216
DATED : September 12, 2000
INVENTOR(S) : Andrzej Loreth

It is certified that error appears in the above-indentified patent and that said Letters Patent is hereby corrected as shown below:

```
Column 2, line 47, before "Electrode", insert
    --In this connection standard corrugated cardboard
    is not suitable.--

Column 4, line 56, delete "portion", and insert
    --portions--.
```

Signed and Sealed this

Twenty-fourth Day of April, 2001

Attest:

NICHOLAS P. GODICI

Attesting Officer

Acting Director of the United States Patent and Trademark Office